Patented Feb. 8, 1938

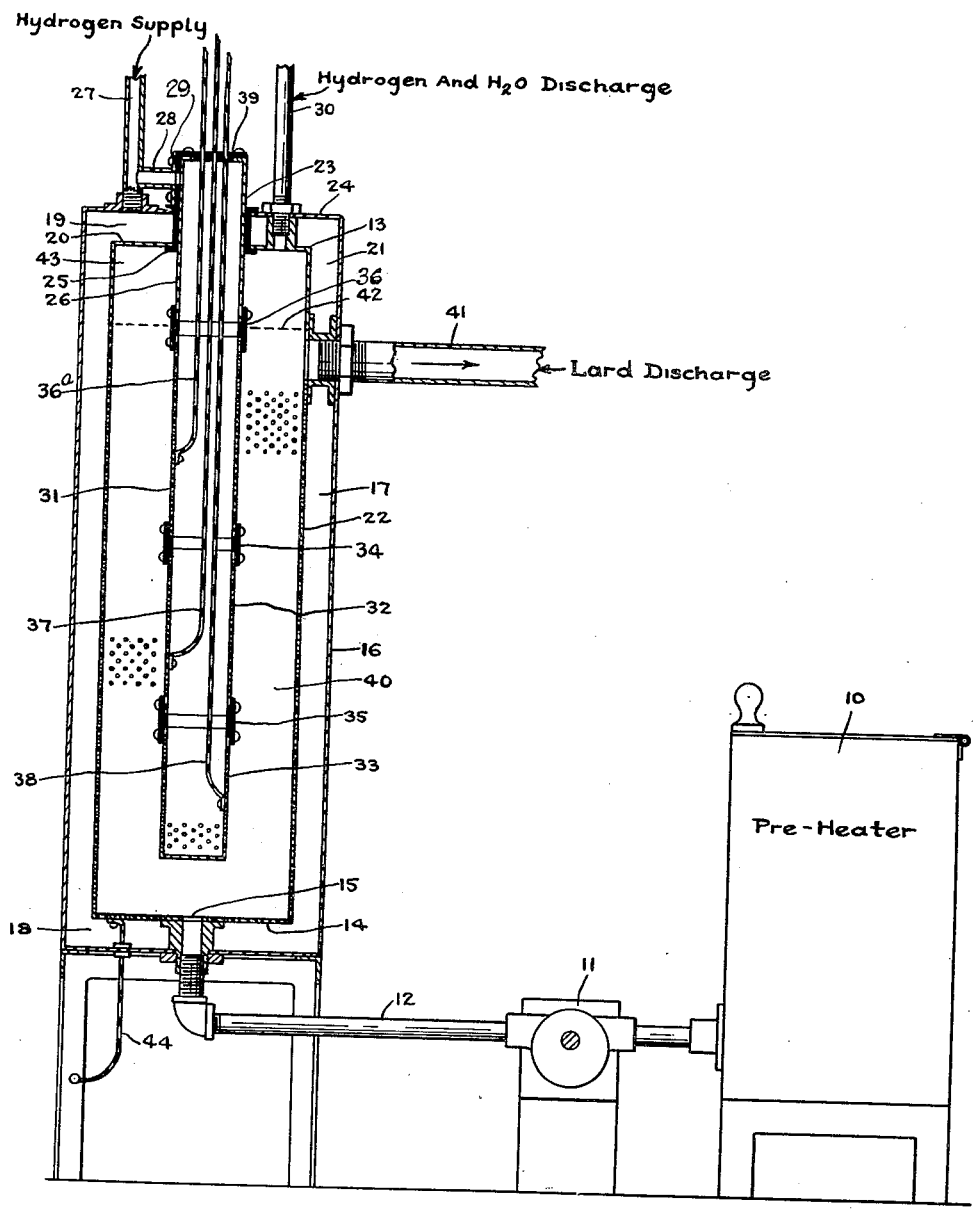

2,107,505

UNITED STATES PATENT OFFICE 2,107,505

PROCESS OF TREATING ANIMAL FAT

Lloyd H. Reyerson, St. Paul, Minn.

Application July 20, 1933, Serial No. 681,305

7 Claims. (Cl. 204—31)

My invention relates to a process of treating animal fat and has for its object to supplant the old method of rendering by the application of a considerable degree of heat and using in place thereof a method of subjecting the animal fat in a melted and fluid state to currents of electricity, passing across the animal fat between electrodes and at the same time subjecting the animal fat so subject to electrical current to hydrogen, whereby the animal fat is both heated and hydrogenated.

The result of this process is to produce a lard which is whiter, has a higher melting point, is more solid, will keep much better, being substantially free from degeneration and resulting rancidity, which has a sweeter and better flavor than lard as formerly rendered from animal fat, and, perhaps most important of all, which has a quality when melted to restrain penetration into the substances being cooked in it, so that there is relatively small lard absorption in such cooking.

It is the object of my invention further to provide apparatus for carrying out my aforesaid process wherein the process will be continuous, and can be carried on in a manner relatively cheap both as regards consumption of power and the handling and delivery of material from its raw to its finished and marketable condition.

The full objects and advantages of my invention will appear in connection with the detailed description thereof, and its novel features are more particularly pointed out in the claims.

In the drawing, illustrating one form of application of my invention, and of apparatus for carrying it out.

The single figure is a sectional elevation and part diagrammatic view of apparatus for carrying out the process of my invention.

As illustrated, animal hog fat suitable for making lard is brought into a fluid condition such that it may be pumped in a preheater indicated diagrammatically at 10. From this preheater the semi-fluid fat is passed by means of a pump 11 through a pipe 12 into the lower portion of a receptacle 13. Said receptacle is preferably cylindrical in form and has an imperforate bottom 14, the pipe 12 opening through the center of said bottom as indicated at 15. The cylinder 13 is within a second cylinder 16 of suitable sheet metal which is concentrically positioned with respect to cylinder 13 and is larger in all of its dimensions so that there is an annular cylindrical space 17 all about cylinder 13, a space 18 below the bottom 14 of cylinder 13 and a space 19 above the imperforate top 20 of cylinder 13.

A part 21 of the cylindrical wall of the cylinder 13 is imperforate. The remaining portion 22 of said wall is formed with fine perforations and is composed of or plated with some suitable metal which will act as a hydrogenating catalyst, such as nickel, platinum, palladium or the like, palladium being very effective for the purpose. Cylindrically located within and along the central portion of cylinder 13 is a third cylinder 23 which extends through top wall 20 of cylinder 13 and top wall 24 of cylinder 16 and is electrically insulated from said walls as indicated at 25. The cylinder 23 has an imperforate portion 26 extending within the chamber inside of cylinder 13 and corresponding to the imperforate portion 21 of said cylinder. A supply pipe 27 leads from a supply source of hydrogen delivered under suitable pressure into the space 17 between cylinders 13 and 16, and by a branch pipe 28 into the interior of cylinder 23 from which it is insulated as indicated at 29. Another pipe 30 leads from the interior of cylinder 13 across the end walls 20 and 23 by which hydrogen and water vapor are discharged from within cylinder 13.

The cylinder 23 is formed of a multiplicity of portions 31, 32, 33 each having walls formed of or plated with a hydrogenating catalyst similar to that employed for the walls 22 of cylinder 13, each of said sets of walls being formed with fine perforations and being severally insulated one from the other by insulator sections 34, 35 and 36. Separate hot wires 36a, 37 and 38 pass through insulation in the end 39, which closes the cylinder 33, and have electrical connection with the respective sections 31, 32 and 33. These sections thus become sheet electrodes with a large amount of surface for passing electric current. Since the temperature of the semi-fluid animal fat in the cylindrical annular space 40 between the adjacent portions of walls of cylinders 13 and 23 will become progressively hotter from the bottom toward the top owing to the electrical current passing therethrough, the resistance will be somewhat inversely as to height of the column of semi-fluid animal fat, for which reason the perforated inner electrodes connected with the several hot wires will become progressively longer as they approach the top. That is, electrode section 31 will be longer than electrode section 32; and electrode section 32 will be longer than electrode section 33. For purposes of illustration, I have shown three such separate electrode sections insulated from one another which will be a satisfactory number in performing the process under some conditions. It is to be understood, however, that a greater or less number of such electrode sections insulated from one another may be employed to meet requirements in any particular form of practicing the process.

The treated animal fat will be discharged through pipe 41, whence it will go to suitable filter pressing machinery of well-known construction, not shown, and after filtering will as lard be packaged for the market. The upper level of said lard is indicated in dotted lines at 42, there being a gas space 43 above said surface connected with the discharge pipe 30.

In the operation of the process and the mechanism above described, the pump 11 will move lard into the chamber 40 within cylinder 13 and up through it at a rate such that the semi-fluid animal fat will remain between the electrodes for a suitable time to produce the quality of lard desired. This time may be from six to thirty minutes. Other conditions being equal, the degree of hydrogenation will vary with the time the semi-fluid animal fat is subjected to hydrogen and electric current. It will also vary with the kind of catalyst forming the plating of perforate portions of cylinders 13 and 23, and it will vary with the degree of pressure with which the hydrogen is delivered. In practice this pressure must always be sufficient to prevent flow of animal fat through the perforations of the cylindrical electrode walls 22 of cylinder 13, and 31, 32 and 33 of cylinder 23. To the extent that it varies above this minimum pressure there will be more or less hydrogen forced through, and consequently more or less hydrogenating action.

In operation electric current moves from the electrodes 31, 32 and 33 across the supporting band of semi-fluid animal fat in the annular cylindrical chamber 40 to the electrode 22, passing therefrom to ground, as indicated at 44. The melted lard is quite highly resistant, which has the effect of causing generation of a considerable degree of heat by the electrical current passing through it. The hydrogen under pressure in the cylindrical annular chamber 17 and within the cylinder 23 not only restrains the animal fat from passing into these chambers, but itself passes through the perforations in the outer electrode 22, and the inner electrodes 31, 32 and 33 to and into the body of semi-fluid animal fat moving upward in the annular cylindrical chamber 40. And the effect of this in conjunction with the catalytic action of the electrodes and the electric current is to fix hydrogen atoms in unsaturated molecules of the melted lard, which is the hydrogenating action. Excess hydrogen and steam thrown off by the heated animal fat pass first into the gas chamber 43 and from there through the discharge pipe 30, from where these gases are carried to a suitable collector of well-known construction not shown where the water vapor is separated from the hydrogen and the hydrogen recollected and pumped back into the original source of supply.

The advantages of my invention have been made to appear in connection with the detailed description thereof heretofore given. The process not only operates continuously, but with relatively small consumption of power, and in a highly sanitary manner. The resulting product has the best qualities of lard and of vegetable fats which are employed as substitutes for lard to avoid unsatisfactory characteristics of rendered lard as now made and sold. Although this process sufficiently heats the lard by electrical means to disintegrate the fat-retaining tissues, there is never any of that overheating which ordinary rendering processes necessarily produce, and which gives to such rendered lard an acrid, burned flavor and has to some extent cracked it, so that it soaks into the substance of materials cooked in it more than it otherwise would, and very much more than is true of lard produced by my process.

I claim:

1. A process of treating animal fat to make lard which consists in moving semi-fluid animal fat in a relatively thin and expanded sheet slowly between two electrodes for a relatively long period of time and over a considerable extent of said electrodes, passing electric current independently to different sections of one of said electrodes, and progressively increasing their extent and area to cause electric current from said several sources to pass therefrom through the sheet of animal fat as the same is being moved to the other electrode.

2. A process of treating animal fat to make lard which consists in moving semi-fluid animal fat in a relatively thin and expanded sheet slowly between two electrodes for a relatively long period of time and over a considerable extent of said electrodes, passing electric current independently to different sections of one of said electrodes progressively increasing in extent and area to cause electric current from said several sources to pass therefrom through the sheet of animal fat as the same is being moved to the other electrode, and introducing hydrogen into the melted animal fat through all said electrode surfaces while the animal fat is subject to the electric current.

3. Apparatus for hydrogenating animal fat to make lard, comprising a pair of finely perforated sheet electrodes in spaced parallel relation forming a relatively narrow expanded chamber between the same, means for introducing semi-fluid animal fat into the bottom of said chamber and causing it to move slowly up to the top thereof and discharge therefrom, means for subjecting the outsides of said electrodes to hydrogen under pressure whereby the animal fat will be held from passing through said perforations and the hydrogen will be caused to move inwardly into the animal fat, and means for passing electric current from one electrode to the other across substantially the entire extent of said chamber to cause the electric current to pass through the mass of animal fat with the hydrogen therein as said sheet is moved.

4. Apparatus for treating lard comprising a pair of cylindrical electrodes positioned concentrically one within the other to form a relatively narrow annular chamber between the same, the inner of said electrodes being divided into a plurality of separate electrode portions of different lengths each supplied with electric current by an independent wire, and means for introducing semi-fluid animal fat into the bottom of said chamber and causing it to move slowly up to the top of said chamber and discharge therefrom whereby the electric current from the sectional interior electrode will be passed through substantially the whole sheet of melted animal fat as the same is moved.

5. Apparatus for treating animal fat to make lard, comprising an outer imperforate cylindrical casing and two perforate cylindrical electrode members of different diameters all concentrically positioned to provide between said electrodes a relatively narrow annular chamber, means for introducing semi-fluid animal fat into the bottom of said chamber and causing it to move slowly up to the top thereof and discharge therefrom, means for introducing hydrogen under pressure into the annular space about the outer electrode and the cylindrical space within the inner electrode whereby the lard will be held from passing through said perforations and the hydrogen will be caused to move inwardly into the lard, and means for passing electric current from one electrode to the other across substantially the entire extent of said chamber to cause the electric current to pass through the sheet of lard with the hydrogen therein as said sheet is moved.

6. Apparatus for treating animal fat to make lard, comprising a pair of concentric cylindrical electrodes of different diameters positioned one within the other to form a relatively narrow annular chamber between the same, said electrodes including a hydrogenating catalyst such as palladium, means for introducing semi-fluid animal fat into the bottom of said chamber and causing it to move slowly up to the top thereof and discharge therefrom, means for passing electric current from one electrode to the other across substantially the entire extent of said cylindrical chamber, and means for forcing hydrogen through the perforations of said electrodes into the annular sheet of animal fat from both sides thereof.

7. Apparatus for treating animal fat to make lard, comprising a pair of concentric cylindrical electrodes of different diameters positioned one within the other to form a relatively narrow annular chamber between the same, said electrodes including a hydrogenating catalyst such as palladium, means for introducing semi-fluid animal fat into the bottom of said chamber and causing it to move slowly up to the top thereof and discharge therefrom, means for passing electric current from one electrode to the other across substantially the entire extent of said cylindrical chamber, means for forcing hydrogen through the perforations of said electrodes into the annular sheet of animal fat from both sides thereof, and means for discharging excess hydrogen from the upper end of said annular sheet.

LLOYD H. REYERSON.